Figure 1:
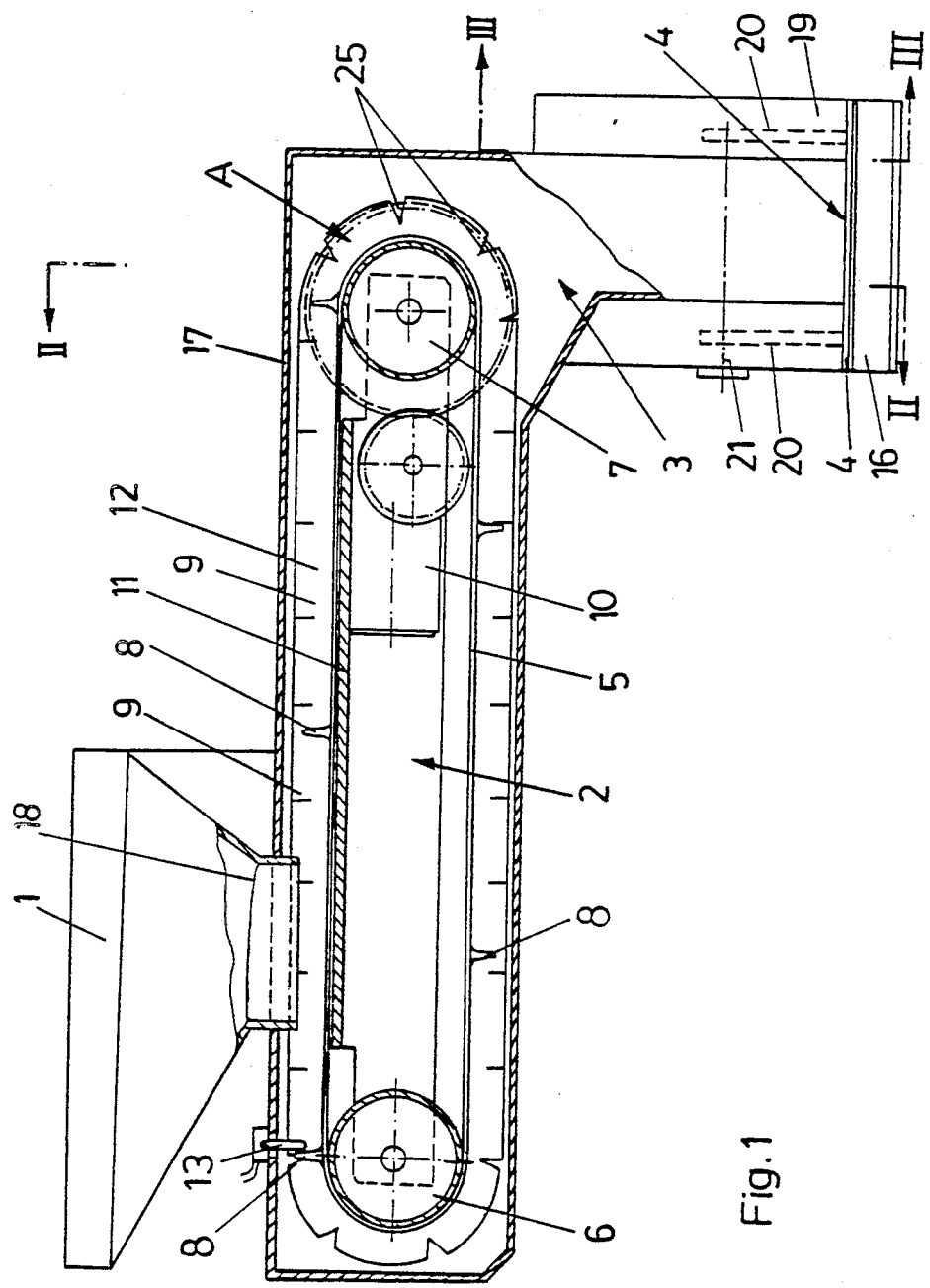

United States Patent [19]

Cervinka

[11] Patent Number: 4,733,891

[45] Date of Patent: Mar. 29, 1988

[54] GRIT SPREADER FOR MOTOR VEHICLES

[76] Inventor: Franz Cervinka, Oberleitenweg 35, A-6370 Kitzbühel, Austria

[21] Appl. No.: 881,042

[22] PCT Filed: Sep. 26, 1985

[86] PCT No.: PCT/AT85/00035

§ 371 Date: Jun. 4, 1986

§ 102(e) Date: Jun. 4, 1986

[87] PCT Pub. No.: WO86/02321

PCT Pub. Date: Apr. 24, 1986

[30] Foreign Application Priority Data

Oct. 9, 1984 [AT] Austria .................. 3189/84

[51] Int. Cl.⁴ ............................................. B61C 15/10
[52] U.S. Cl. .................................... 291/27; 222/371; 222/415; 198/858; 291/25
[58] Field of Search ............... 198/821, 858, 524, 527; 222/63, 415, 371; 291/27, 25, 22

[56] References Cited

U.S. PATENT DOCUMENTS

| | | | |
|---|---|---|---|
| 423,906 | 3/1890 | Conkling | 198/821 |
| 2,574,287 | 11/1951 | Rome | 291/27 |
| 4,062,974 | 12/1977 | Herbold | 222/371 |

FOREIGN PATENT DOCUMENTS

| | | |
|---|---|---|
| 375985 | 1/1931 | Belgium . |
| 557568 | 6/1957 | Belgium . |
| 0149417 | 7/1985 | European Pat. Off. . |

Primary Examiner—Kenneth J. Dorner
Assistant Examiner—Gerald A. Anderson
Attorney, Agent, or Firm—McGlew and Tuttle

[57] ABSTRACT

A grit spreader for motor vehicles consists of a container (1) for the gritting material, a dispersion channel leading to a vehicle wheel and an endless conveyor (5). The conveyor (5) is disposed in a first horizontal section (2) of the dispersion channel and is divided into individual chambers (9) by transverse webs (8). The discharge end of the conveyor (5) lies above a second section (3) of the dispersion channel comprising the outlet (4) and which leads to the vehicle wheel and is closable by means of a flap (16). The drive unit (10) of the conveyor (5) is provided with a follow-up control which only stops the drive unit (10) following actuation of a cutout switch when a transverse web (8) of the conveyor (5) enters the upper return section (A) of the conveyor pulley (7) disposed at the discharge end.

10 Claims, 5 Drawing Figures

GRIT SPREADER FOR MOTOR VEHICLES

The present invention relates to a grit spreader for motor vehicles comprising a container for the gritting material and a dispersion channel leading to a vehicle wheel and having a conveying installation and an outlet that can preferably be closed by means of a bottom flap.

Various types of spreaders are already known, these spreaders being operated in the event of an emergency, particularly in the event of sudden slippery conditions, in order to spread sand or grit directly in front of the wheels of a motor vehicle. It is known to use various sytems for transporting sand from the storage bin to the dispersion site. The German O.S. No. 30 45 546, for example, shows a worm conveyor in the dispersion channel and the Austrian Pat. No. 349,328 shows a vibrating chute for transverse conveyance. Conveyance by means of gravity from a closable container and the use of air or exhaust gases have likewise already been proposed.

On the whole, all of the known proposals cannot satisfactorily solve the problem of spreading sand for motor vehicles since the conveying system is continuously subjected to changing conditions or is from the start poorly suited. Thus, transporting sand and, above all, grit by means of worm conveyors, which ensure a continuous transport, is disadvantageous on account of wear and tear, abrasion and the danger of blockage. The continuous conveyance and above all the immediate readiness for use of the gritting material is not guaranteed with vibrating chutes, however, on account of vehicle vibrations, vibrations due to road conditions as well as the side forces when driving around corners. With flaps loaded directly with grit or sand, valves for compressed-air lines are operationally unsafe through possible obstructions or the build-up of material, and there is, in addition, in the end caps loaded with grit or sand, the danger of the sand or grit freezing at the channel outlet.

It is the object of the invention to find a solution which to a greater degree guarantees the function of the spreader in an emergency.

This is achieved according to the invention in that an endless conveyor is arranged in a first section of a dispersion channel serving as a conveying installation, said endless conveyor being divided into individual chambers by transverse webs and its discharge end lying above a second section of the disperion channel comprising an outlet, a drive unit of the conveyor being provided with a follow-up control which stops the drive unit following actuation of a cutout switch only when a transverse web of the conveyor enters the upper return section of the conveyor pulley disposed at the discharge end.

Conveyors with transverse webs and lateral walls which are variable in length by means of folds are known, for example, from the German Pate. Nos. 18 16 273 and 21 00 364. The conveyor lies directly below the open container outlet so that when the conveyor is put into opeation grit is conveyed continuously. The horizontal conveying distance is thereby unimportant. It is thus possible, on the one hand, to place gritting material in front of the wheel from every position in the motor vehicle suitable for accommodating the grit container. On the other hand, the horizontal conveying distance can be so short that the conveyor essentially only forms a narrowing of the container outlet to the cross-section of the second conveyor section. At the discharge end the gritting material falls freely through the downwardly directed section of the dispersion channel, its bottom flap, which is preferably provided, being opened when the conveyor is switched on. By means of the follow-up control the conveyor stops when switched off in such a way that a transverse web is located at least in one vertical plane of the conveyor pulley at the discharge end or has entered just into its upper return section, and when switched on again the chmaber closest to the discharge end is emptied immediate. As a result of this, that transverse web of the conveyor prevents a premature emptying of the chamber over the discharge end and further transverse webs in the upper conveying section prevent a reverse flow of the gritting material in the direction of the grit container on account of vehicle vibrations. Preferably, a conveyor is used which is U-shaped in cross-section with lateral walls variable in length which are preferably made from expandable material and which have, extending from the outer longitudinal edge, slits approximately half the height of the lateral walls. This guarantees, on the one hand, the lateral guidance of the gritting material up to the discharge into the downwardly directed section of the dispersion channel and, on the other hand, a material preservation of the lateral walls of the conveyor is also achieved.

In a preferred embodiment the follow-up control is controlled by a sensor which projects into the orbit of the transverse webs. This sensor can, as such, be fastened at any point at which its impingement following actuation of the cutout switch stops the conveyor in such a way that the last transverse web of the upper conveying section stops above the upper section of the conveyor pulley disposed at the discharge end.

The sensor is preferably disposed in the region of the conveyor pulley at the feed end, and its distance to the start of the upper section of the conveyor pulley at the discharge end is an integral multiple of the distance of two transverse webs and, for example, projects downwardly from the cover of the first section of the dispersion channel. With the presence of a bottom flap at the outlet of the second section, the impingement of the sensor by a transverse web following actuation of the cutout switch can also, preferably with a slight delay, switch on a drive unit for the closure of the bottom flap so that it is only closed when the downwardly directed section of the dispersion channel is emptied, thereby avoiding the deposit of gritting material on the flap and its blockage and guaranteeing the seal of the outlet.

In a further preferred embodiment when the conveyor is stationary a transverse web extends between the feed end of the upper conveying section and the container outlet, whereby a reverse flow of the gritting material emerging freely from the container outlet to the conveyor pulley at the feed end on account vehicle vibrations or side forces is prevented. A partial emptying of the container as well as blockage of the horizontal section of the dispersion channel is thereby avoided.

To drive the conveyor and the preferred bottom flap, two electric motors are provided which are powered by the electrical system of the vehicle. Of course, other driving means are also possible.

Embodiments of the invention will now be described, by way of example, with reference to the accompanying drawings.

Figure 2:
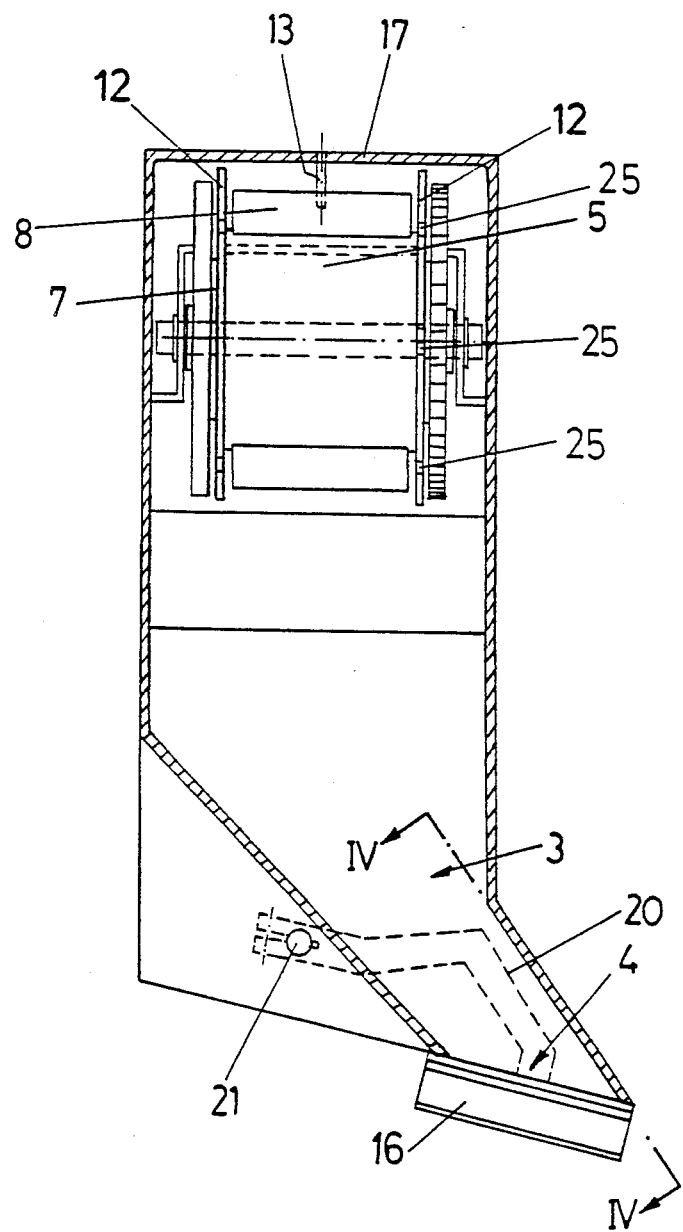
Figure 3:
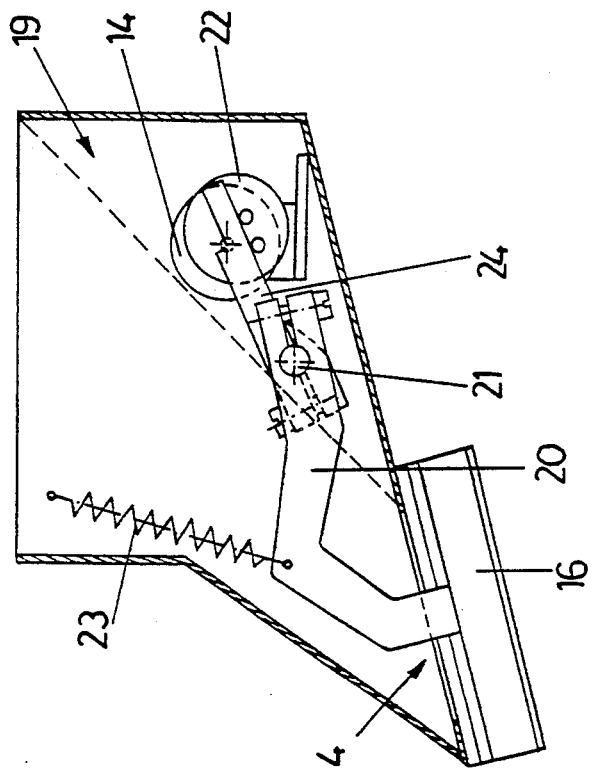
Figure 4:
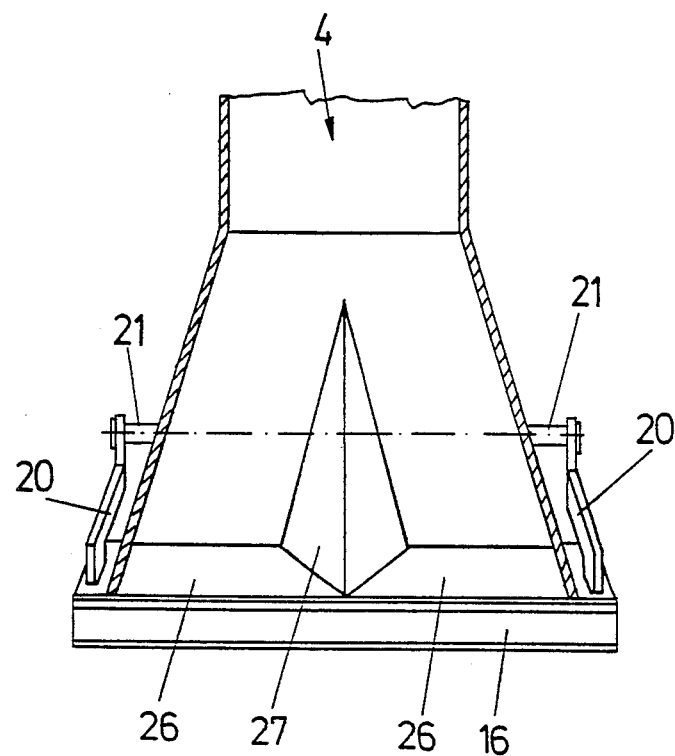
Figure 5:
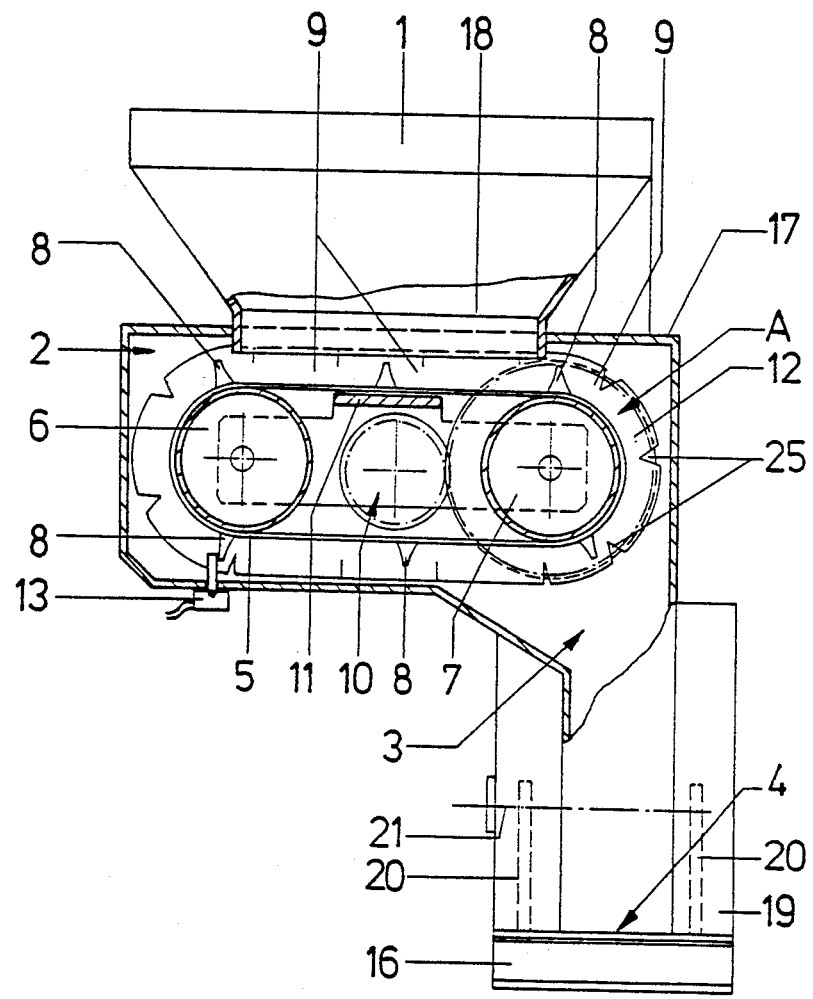

FIG. 1 shows a longitudinal section through a spreader according to the invention;

FIG. 2 shows a section along line II—II in FIG. 1;
FIG. 3 shows a section along line III—III in FIG. 1;
FIG. 4 shows a section along line IV—IV in FIG. 2; and
FIG. 5 shows a longitudinal section through a second embodiment similar to FIG. 2.

The grit spreader, which can be mounted in a motor vehicle, in particular an automobile, in a manner not illustrated in any detail, comprises a container 1 for the gritting material, with a funnel-shaped container outlet 18. The container outlet 18 extends through a cover 17 into the first section 2 of a closed dispersion channel having two sections 2, 3. The dispersion channel leads to the vehicle wheel to be supplied with gritting material and has an outlet 4 which is closable by means of a downwardly swivelling bottom flap 16 and which is possibly provided with an electrical heating system to prevent the flap from freezing onto the outlet housing. A conveyor 5 is disposed in the first horizontally extending section 2 of the dispersion channel, said conveyor being guided about a conveyor pulley 6 at the feed end and a conveyor pulley 7 at the discharge end. The conveyor 5 is movable by menas of an electric motor 10 which can be operated by the electrical system of the motor vehicle, a gear unit placed in front of the motor 10 driving the conveyor pulley 7 at the discharge end. The conveyor 5 is U-shaped in cross-section and is equipped at specific distances with transverse webs 8. The lateral walls 12 of the conveyor 5, which must be variable in length in the return region, may, for example, be corrugated. Another possibility is illustrated in the drawing, according to which the lateral webs 12 are made from expandable material and have slits or notches 25 which preferably extend over half the height of the lateral walls. The upper conveying section of the conveyor 5 slides on a support plate 11. The upper section of the conveyor pulley 7 at the discharge end is marked "A", whereby the gritting material in section A falls freely into the essentially vertical or sharply inclined, downwardly directed section 3 of the dispersion channel. The housing of section 3 encloses a second chamber 19 in which the actuating mechanism for the bottom flap 16 which closes the outlet 4 is accommodated. The downwardly swivelling bottom flap 16 is disposed on levers 20 which are pivotable about axis 21 at the end of the dispersion channel. One of the two levers 20 is double-armed, whereby its second lever arm 24 co-operates with a cam 22 which can be driven by an electric motor 14. A restoring spring 23 sees to it that the bottom flap is returned to its starting position, but this could also be effected by the cam 22.

The grit spreader works as follows: Both electric motors 10, 14 are simultaneously started by means of a switch provided, for example, on the dashboard, whereby the bottom flap 16 is opened via the cam 22 and the outlet 4 of the dispersion channel is thus unblocked. The gritting material flowing from the grit container 1 onto the conveyor is carried by the conveyor 5 and the transverse webs 8 and at the discharge end falls freely into the downwardly directed section 3 of the dispersion channel and through the open outlet 4 adjacent to the vehicle wheel for spreading the gritting material in front of the wheel. The formation of the individual chambers 9 by the transverse webs 8 of the conveyor 5 guarantees that alloted amounts of gritting material are ready for use over the entire conveying length despite vibrations and centrifugal forces, so that switching on the conveyor drive unit also causes an immediate discharge of gritting material at the discharge end. If no further gritting material is required, then the switch on the dashboard is actuated again. A follow-up control guarantees that the drive motor 10 of the conveyor 5 continues to move the conveyor until a transverse web 8 enters the upper section A, whereby, on the one hand, the gritting material in the last chamber 9 is discharged and, on the other hand, the gritting material contained in the next chamber 9 can be discharged immediately when the spreader is used again. In order to determine the time of stoppage, a sensor 13 coupled to a cutout switch is provided, said sensor extending according to FIG. 1 in front of the container outlet 18 and according to FIG. 5 at the lower side of the first section 2 of the dispersion channel, in each case in the region of the conveyor pulley 6 at the feed end, into the orbit of the transverse web 8. The cirucit is designed in such a way that the cutout switch on the sensor 13, which is displaced by every transverse web 8, does not break the circuit of the electric motor until after the switch on the dashboard is actuated. It is unimportant whether electric or electronic components are used for this. The impingement of the sensor 13 following actuation of the dashboard switch also actuates simultaneously or after a slight delay the electric motor 14 which starts the return of the bottom flap 16 to the closed postion via the cam 22. Since the closing process of the bottom flap 16 just starts approximately two seconds after the conveyor 5 stops, gritting material discharged from the last chamber 9 in the return section is spread through the still open outlet 4 so that no gritting material is found on the bottom flap 16 after it closes and the downwardly directed section 3 of the dispersion channel is completely empty.

FIG. 4 illustrates the region of the outlet 4 in a design suitable for dual wheels, wherein all remaining components are unchanged. The outlet 4, which is again closed by a bottom flap 16, is expanded to a width corresponding to the dual wheels. To achieve optimum use of the gritting material taken along in only limited quantities for reasons of expense and weight, the widened outlet 4 is divided into two partial outlets 26 so that a strip over which no gritting material is spread remains between the dual wheels. The division is achieved by a separating or guiding element 27. which rises to approximately half the height from the base of the dispersion channel. It has proven advantageous to arrange the two flanks of the element 27 at right angles to one another.

In the variant shown in FIG. 5, the conveyor 5 only serves to meter the required amount of gritting material. The container outlet 18 must have a larger opening cross-section than corresponds to the requirement for gritting material in order to prevent the build-up of gritting material since the consumption of gritting material would otherwise be unnecessarily high. In this case the conveyor serves as a non-blocking throttle of the container outlet 18 and the horizontal section 2 of the dispersion channel is only the required minimum length for accommodating the conveyor 5.

I claim:
1. Grit spreader for motor vehicles for spreading gritting material in front of a wheel of the vehicle, under the control of the operator of the vehicle, comprising
   a supply container for gritting material having a supply outlet,
   a housing defining a closed dispersion channel divided by an intermediate transition portion thereof into a first section extending generally horizontally and joined with the supply outlet, and a second section forming a continuation of the first section at the transition portion and extending generally downwardly therefrom to a spreader outlet which is adapted to be located adjacent a wheel of the vehicle for spreading gritting material in front of the wheel, an endless conveyor disposed on a pair of deflection pulleys in the first section, including an upstream supply pulley adjacent the supply outlet, and a downstream discharge pulley at the transition portion and overlying the second section, each pulley having an upper deflection part and a lower deflection part, the conveyor defining an upper conveying run and a lower return run extending between an upstream conveyor supply end at the supply pulley and a downstream conveyor discharge end at the discharge pulley, in which the upper run is separated from the lower run and positioned to receive gritting material from the supply outlet and to convey such gritting material to the discharge end while maintaining the gritting material out of contact with the lower run, a plurality of spaced apart successive transverse webs provided on the conveyor to define a continuous line of successive individual chambers between corresponding pairs of successive webs, such that each chamber is formed between a leading web and a trailing web, a drive unit arranged to drive the conveyor for conveying the upper run towards the discharge end, and a follow-up control, for operation while the drive unit is driving the conveyor and in response to the vehicle operator initiated shut off of the drive unit, for delaying the actual stopping of the drive unit until the next successive web reaches the adjacent upper deflection part of the discharge pulley, whereby to assure complete discharge of the gritting material from the downstream chamber thereahead and retention of the gritting material in the next successive chamber.

2. Spreader of claim 1 wherein the conveyor is in the form of a U-shaped cross section belt having lateral walls variable in length for travelling around the pulleys between the upper and lower runs, and having slits extending into each wall from the outer longitudinal edge thereof for a distance corresponding to approximately half the height of the wall.

3. Spreader of claim 2 wherein the belt is made of expandable material.

4. Spreader of claim 1 wherein the line of chambers moves along a path in the form of an orbit, and the follow-up control includes a sensor which projects into the orbit for sensing when the next successive web reaches the adjacent upper deflection part of the discharge pulley, for operation of the follow-up control for actual stopping of the drive unit in response to the vehicle operator initiated shut off of the drive unit when the next successive web is sensed following the operator initiated shut off of the drive unit.

5. Spreader of claim 4 wherein the sensor is arranged in the region of the supply pulley at a distance from the upper deflection part of the discharge pulley corresponding to an integral multiple of the distance between two successive webs.

6. Spreader of claim 1 wherein the supply outlet, pulleys and webs are arranged such that when the conveyor is stopped with the next successive web adjacent the upper deflection part of the discharge pulley, a web is disposed as a trailing web on the upper run between the supply pulley and the supply outlet, whereby to assure retention of the gritting material in the chamber defined between said trailing web and the next web thereahead on the upper run.

7. Spreader of claim 1 wherein the supply outlet and pulleys are arranged such that the supply outlet is substantially coextensive with the upper run, and the upper run is arranged crosswise of and closely adjacent to the supply outlet to form a metering throttle for the supply outlet for metering the gritting material from the supply outlet into the successive chambers as the webs move crosswise of the supply outlet on the upper run.

8. Spreader of claim 1 wherein the upper run is separated from the lower run by an intervening support plate for the upper run.

9. Grit spreader for motor vehicles for spreading gritting material in front of a wheel of the vehicle, under the control of the operator of the vehicle, comprising a supply container for gritting material having a supply outlet, a housing defining a closed dispersion channel divided by an intermediate transition portion thereof into a first section extending generally horizontally and joined with the supply outlet, and a second section forming a continuation of the first section at the transition portion and extending generally downwardly therefrom to a spreader outlet which is adapted to be located adjacent a wheel of the vehicle for spreading gritting material in front of the wheel, and endless conveyor disposed on a pair of deflection pulleys in the first section, including an upstream supply pulley adjacent the supply outlet, and a downstream discharge pulley at the transition portion and overlying the second section, each pulley having an upper deflection part and a lower deflection part, the conveyor defining an upper conveying run and a lower return run extending between an upstream conveying supply end at the supply pulley and a downstream conveyor discharge end at the discharge pulley, in which the upper run is separated from the lower run and positioned to receive gritting material from the supply outlet and to convey such gritting material to the discharge end while maintaining the gritting material out of contact with the lower run, a plurality of spaced apart successive transverse webs provided on the conveyor to define a continuous line of successive individual chambers between corresponding pairs of successive webs, such that each chamber is formed between a leading web and a trailing web, a conveyor drive unit arranged to drive the conveyor for conveying the upper run towards the discharge end, closure means for closing the spreader outlet, including a closure flap operated by a linkage for moving the flap to close the spreader outlet, and a flap drive unit for driving the linkage for moving the flap, and a follow-up control, for operation while the conveyor drive unit is driving the conveyor and in response to the vehicle operator initiated shut off of the conveyor drive unit, for delaying the actual stopping of the conveyor drive unit until the next successive web reaches the adjacent upper deflection part ot the discharge pulley, whereby to assure complete discharge of the gritting material from the downstream chamber thereahead and retention of the gritting material in the next successive chamber, and in turn for further operation to cause the flap drive unit to drive the linkage for moving the flap to close the spreader outlet upon the stopping of the conveyor drive unit.

10. Spreader of claim 9 wherein the linkage for moving the flap includes a cam disk driven by the flap drive unit and operatively connected to a follower arm pivoted to the housing and carrying the flap.

* * * * *